United States Patent [19]

Merlo

[11] 3,733,585

[45] May 15, 1973

[54] SYSTEMS FOR DETECTING ERRORS IN A DIGITAL TRANSMISSION CHANNEL

[75] Inventor: David Merlo, Hatfield, England

[73] Assignee: The Post Office, London, England

[22] Filed: June 7, 1971

[21] Appl. No.: 150,659

[52] U.S. Cl...340/146.1 D, 178/69.5 R, 340/146.1 E

[51] Int. Cl. ..............................................G08c 25/00

[58] Field of Search ................340/146.1 E, 146.1 D, 340/146.1 AQ; 179/15 AE, 15 BS; 178/69.5 R

[56] References Cited

UNITED STATES PATENTS

| | | | |
|---|---|---|---|
| 2,956,124 | 10/1960 | Hagelbarger | 340/146.1 AQ |
| 3,227,999 | 1/1966 | Hagelbarger | 340/146.1 AQ |
| 3,508,197 | 4/1970 | Tong | 340/146.1 AQ |
| 3,562,710 | 2/1971 | Halleck | 340/146.1 D |
| 3,587,043 | 6/1971 | Mengani | 340/146.1 D |

*Primary Examiner*—Charles E. Atkinson
*Attorney*—Hall & Houghton

[57] ABSTRACT

A system for detecting transmission errors arising in a digital transmission channel in which digits of a predetermined multidigit check signal not related to the information digits, are inserted successively after respective groups of information digits before transmission. After transmission the digits of the check signal are extracted and compared with the predetermined check signal, errors extracted indicating malfunctioning of the channel and loss of alignment of the check signal extraction. If the extraction of the check signal digits is out of alignment with the structure of the digital information after transmission, the rate of occurence of errors will be very high, and the detection of a very high error rate can be used to effect alignment of the check signal extraction with the structure of the digital information after transmission. A lower error rate indicates malfunctioning of the channel.

5 Claims, 4 Drawing Figures

Patented May 15, 1973 3,733,585

4 Sheets-Sheet 1

DAVID MERLO,
INVENTOR

BY Hall & Houghton
ATTORNEY

Patented May 15, 1973 3,733,585

4 Sheets-Sheet 2

DAVID MERLO,
INVENTOR

BY Hall & Houghton
ATTORNEY

Patented May 15, 1973 3,733,585

4 Sheets-Sheet 3

DAVID MERLO,
INVENTOR

BY [signature]
ATTORNEY

Patented May 15, 1973 3,733,585

4 Sheets-Sheet 4

DAVID MERLO,
INVENTOR

BY [signature]
ATTORNEY

SYSTEMS FOR DETECTING ERRORS IN A DIGITAL TRANSMISSION CHANNEL

The present invention relates to a system for detecting errors in a digital transmission channel.

It is well known to transmit information in digital form over a channel for the purpose of economizing on channel bandwidth but one of the penalties of the lack of redundancy in a digital signal is that errors can go undetected. Various proposals have been made for the detection of such errors but are usually dependent on the form of the information transmitted. One such system for error detection is the use of parity bits where the total number of bits in a group is made up to an odd or even total by the selective introduction of an additional bit in the group, and at the receiver the total number of bits in the augemented group is checked to see whether the total is odd or even as required. As stated above, such error detecting systems require processing of the digital information itself and in any transmission facility it may be that the responsibility for the digital transmission channel is assumed by an authority other than that providing the transmission and reception facilities, and such authority would be concerned with the correct functioning of the channel regardless of any malfunctioning of the transmission and reception facilities.

It is, therefore, an object of the invention to provide an error detecting system suitable for detecting the operation of a digital transmission channel without processing the information to be transmitted.

According to the present invention there is provided a system for detecting malfunctioning of a digital transmission channel in which a predetermined multidigit check signal is interspersed amongst information digits transmitted through the channel and extracted on receipt after passage through the channel, the extracted check signal being examined for differences from the known check signal.

In order that the invention may be fully understood and readily carried into effect it will now be described with reference to the accompanying drawings of which:

Figure 1:
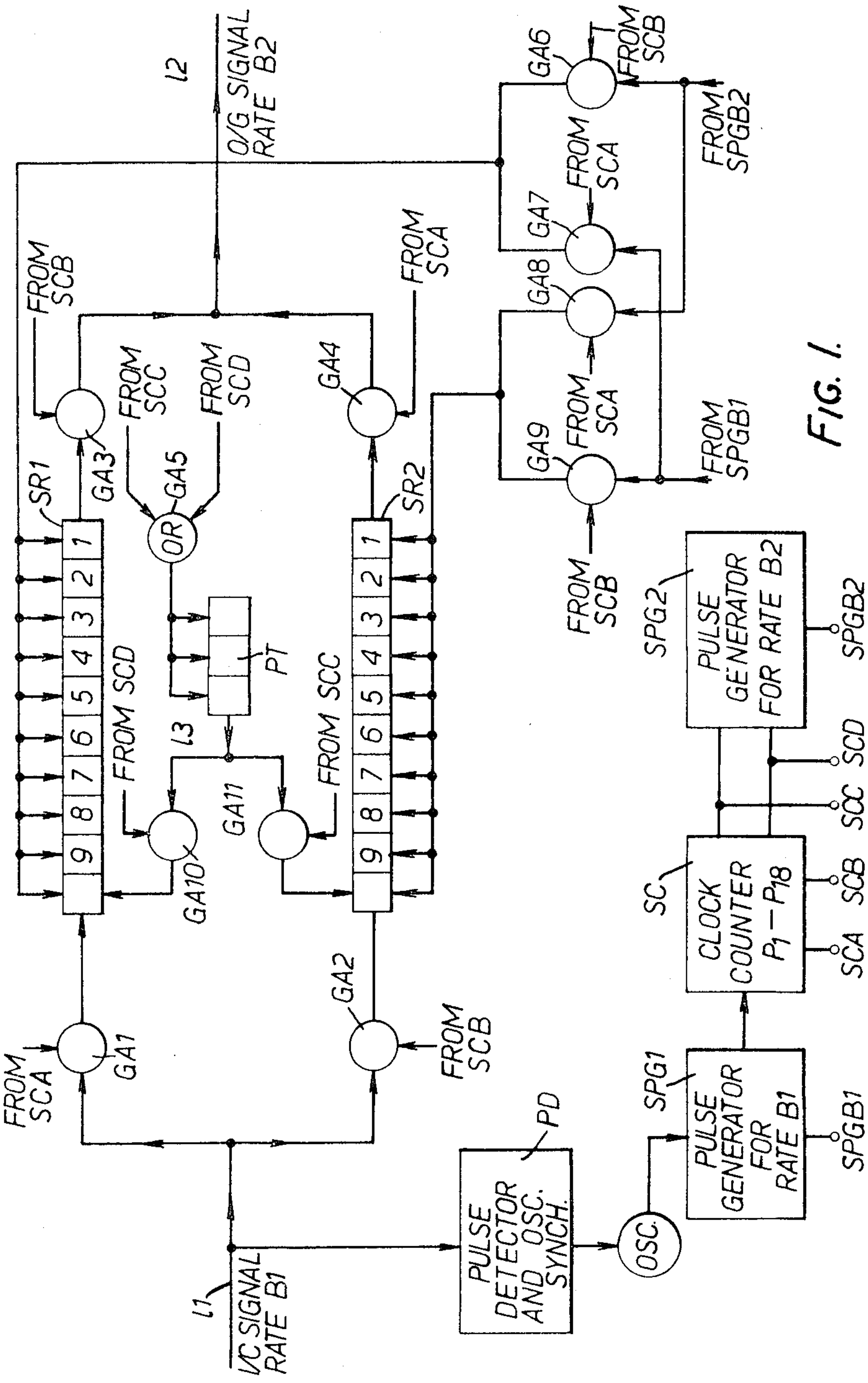
FIG. 1 is a diagram of one example of a sending terminal employing a system according to the invention.

Referring to FIG. 1, a continuous digital signal stream is incoming to the sending terminal there depicted over the incoming line 11, the pulse rate of the incoming digit stream being the rate B1.

Figure 2:
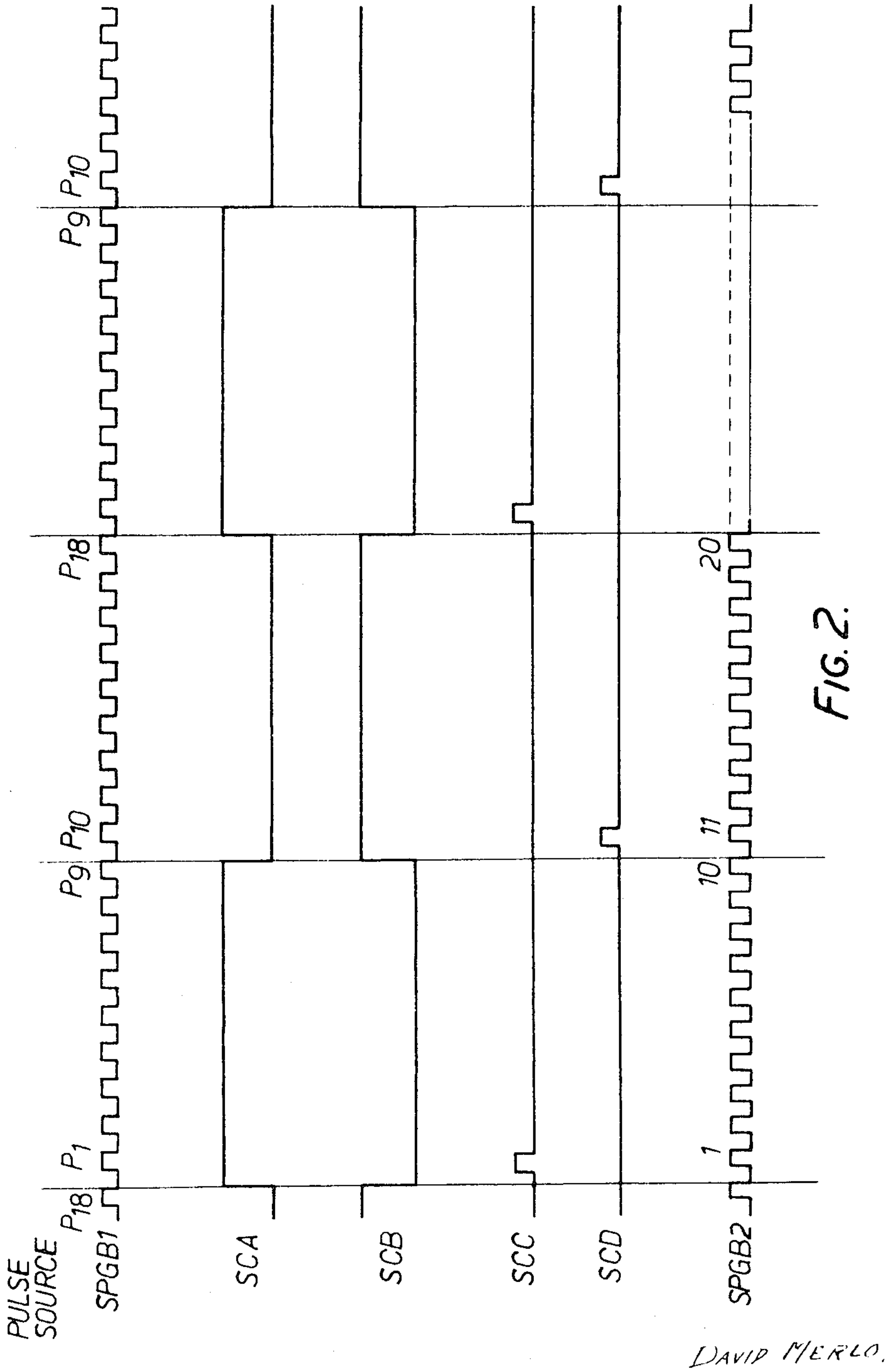
FIG. 2 shows some waveforms used in FIG. 1.

The pulses of the incoming pulse stream are detected by a pulse detector and oscillator synch element PD, which in known manner detects the pulses in the pulse stream and derives timing information therefrom, which serves to synchronize a master oscillator OSC for the sending terminal. The oscillator OSC, in turn, drives a pulse generator SPG which produces at its output terminal SPGB1 a continuous stream of digit marking pulses at the recurrence rate B1 of the incoming digit stream, as indicated at SPGB1, FIG. 2. The pulse generator SPG1 also drives a clock counter element SC, which, by counting the generated pulses in groups of eighteen like polarity pulses in two successive subgroups of nine like polarity pulses each, is adapted to provide control pulses SCA, SCB, SCC and SCD, at its like designated output terminals. These control pulses are also depicted in FIG. 2. Thus, the control pulses SCA are pulses which are "ON" for alternate groups of nine like polarity digit pulses (i.e., $P_1$ to $P_9$) and "OFF" for the intervening groups of nine pulses (i.e., $P_{10}$ to $P_{18}$) repeatedly, while the control pulses SCB are the converse of the control pulses SCA, i.e., are "OFF" for the alternate groups of nine digit pulses ($P_1$ and $P_9$) and are "ON" for the intervening groups ($P_{10}$ to $P_{18}$). The control pulses SCC and SCD are individual digit marking pulses which mark the start or first pulse position in each sub-group of nine digit pulses, i.e. the control pulses SCC mark the first pulse position in each alternate sub-group $p_1$ to $P_9$ while the control pulses SCD mark the first pulse position in each intervening subgroup $P_{10}$ to $P_{18}$. These latter control pulses (SCC and SCD) also drive a second pulse generator SPG2, which is adapted to provide, at its output terminal, a stream of digit marking pulses SPGB2 at a recurrence rate B2, where in the present example the rate B2 = 10/9 times the rate B1. Thus during each sub-group of nine digit marking pulses at the rate B1 there are produced 10 digit marking pulses at the rate B2, as indicated at SPGB2, FIG. 2.

The line equipment shown in FIG. 1 serves, in general, to compress in time each sub-group of 9 digital signals incoming to the send terminal at the digit rate B1, so as to create an extra digit period at the end of each sub-group for the insertion of one bit of a check pattern. The sub-groups may or may not be related to the structure of the digital signal. The composite digit stream so produced comprises the incoming digit stream plus the inserted check pattern digits, and is transmitted from the send terminal at the digit rate B2. To this end, two shift registers SR1 and SR2 are provided in the path of the incoming digital signal stream. These stores are arranged to operate sequentially and alternately, by gates GA1, GA2, GA3 and GA4 controlled by pulses SCA and SCB as shown, so that while information is being written into one store, information is being read out from the other, and vice-versa. During writing-in each store is driven at the recurrence rate B1 by pulses from the pulse source SPGB1, and during reading-out each is driven at the recurrence rate B2 by pulses from the pulse source SPGB2, the switching of the driving pulses being effected by the gates GA6 to GA9 inclusive, under control of the control pulses SCA and SCB. The check pattern, which in principle may be any binary digital pattern although it is preferably a pseudo-random pattern, is generated by a pattern generator PT which is driven by output pulses from the OR gate GA5, the inputs to which are provided by the pulse sources SCC and SCD. The output pattern generator PT comprises one pattern "bit" for each sub-group of 9 bits of the incoming signal stream and the insertion of these pattern bits into the last storage element of each shift register, sequentially with the insertion thereto of the 9 incoming signal bits is controlled by the coincidence gates GA10 and GA11, each of which has one input provided from the output of the pattern generator PT and a second input provided from the pulse sources SCC and SCD, respectively. With the arrangement shown it is assumed that the delays occurring in the OR gate GA5 and the input circuit of the pattern generator PT are such that the next pattern bit generated by the pattern generator PT does not appear on its output lead 13 until after the termination of the pulse SCC or SCD which initiated the pattern shift, but the pattern bit remains at the output of the pattern generator PT until the next SCC or SCD pulse is received by the pattern generator PT.

The transmitted composite digital signal is fed from the registers SR1 and SR2 via gates GA3 and GA4 to the outgoing line l2.

Considering the circuit action of the line equipment of FIG. 1 in greater detail, the pulses of the digit stream incoming over the lead l1 are applied to one input to each of the coincidence gates GA1 and GA2, the second inputs to which are respectively provided from the pulse sources SCA ($P_1$ to $P_9$) and SCB ($P_{10}$ and $P_{18}$). It will be assumed for the sake of description that the pulse SCA has just commenced and that the pulse SCB has just terminated. Thus the gate GA1 is primed to pass the next nine incoming digit signals from the line L1 into the shift register SR1, while the gate GA4 is primed to pass the 10 digit bits (nine digit signals plus one pattern bit) from the register SR2 to the outgoing line l2. For the writing of the incoming digit signals into the register SR1 the gate GA7 is also primed by the pulse SCA to pass nine pulses from the pulse source SPGB1 to drive the register SR1 at the rate B1, while for the reading of the information bits from the register SR2, the gate GA8 is primed by the pulse SCA to pass 10 pulses from the pulse source SPGB2 to drive the register SR2 at the rate B2.

Coincident with the commencement of the pulse SCA, i.e., at time P1, the digit marking pulse SCC appears and is applied via the OR gate GA5 to step the pattern generator PT, which operates to present the next pattern bit on its output lead l3. However, as previously mentioned, by arrangement of the OR gate GA5 and the input circuits of the pattern generator PT, the pulse SCC has terminated prior to the appearance of the next pattern bit on the output lead l3 of the generator PT. The pattern bit which is present on the lead l3 on the occurrence of the pulse SCC is passed by the opening of gate GA11, to the last storage position of the shift register SR2, from which position it is read out in sequence with the 9 digit signal bits previously stored, via gate GA4, as described above.

Upon the termination of the pulse SCA and the commencement of the pulse SCB, the gates GA1 and GA4 are closed, while the gates GA2 and GA3 are opened. Also, coincident with or shortly after the start of the pulse SCB, the digit marking pulse SCD appears with the result that the gate GA10 is opened to pass the next check pattern digit which was generated by the last SCC pulse on the lead l3 into the last storage position of the register SR1. In this way the role of the stores is changed over, the next nine digit signal pulses from the line l1 being written into the register SR2, while the 10 information bits stored in the register SR1 are read out to the line l2. Again, consequent upon the termination of the pulse SCA and the commencement of the pulse SCB, the gates GA7 and GA8 are closed while the gates GA6 and GA9 are opened. Thus the driving pulses SPGB1 are now applied to the register SR2 to cause this register to take in information digits at the rate B1, while the driving pulses SPGB2 are applied to the register SR1 to cause this register to be read out at the rate B2.

The above described action is repeated sequentially so that on the output lead l2 there appears a composite digit stream at the uniform digit rate B2 and comprising sub-groups of 9 signal digit bits separated from one another by one bit of the pattern generated by the generator PT.

Figure 3:
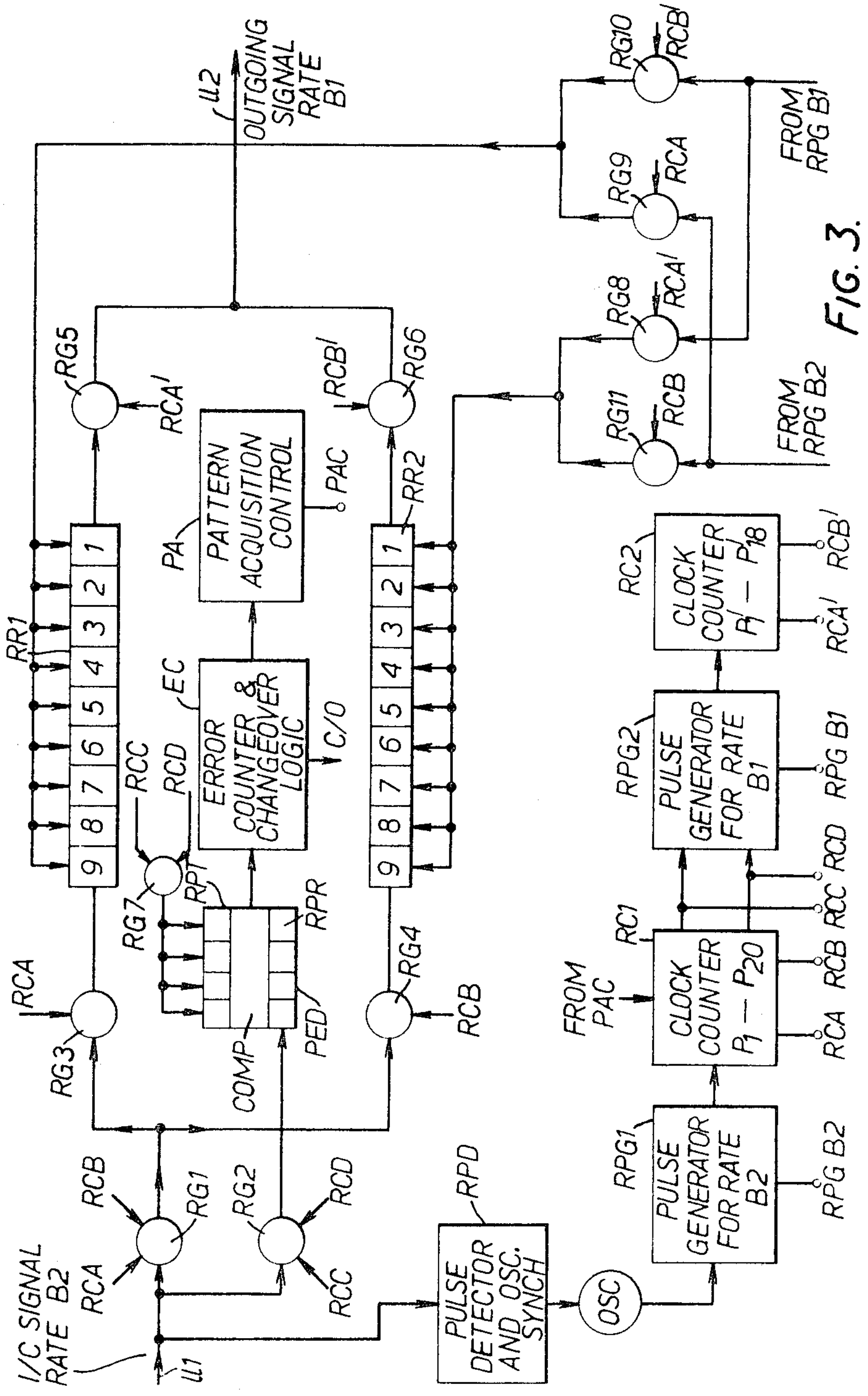
FIG. 3 is a diagram of one example of a receiving terminal of a system according to the invention.

Referring now to the receive terminal equipment shown in FIG. 3 of the drawings, this serves to accept the composite digit stream as transmitted from the send terminal at the digit rate B2, to extract therefrom the pattern bits inserted at the send terminal and pass these to the pattern error detecting element PED, to stretch the received sub-groups of digit signal bits in time so as to eliminate the extra digit periods occupied by the extracted pattern and pass the digit signal bits forward in the form of a continuous bit stream at the original digit rate B1.

Figure 4:
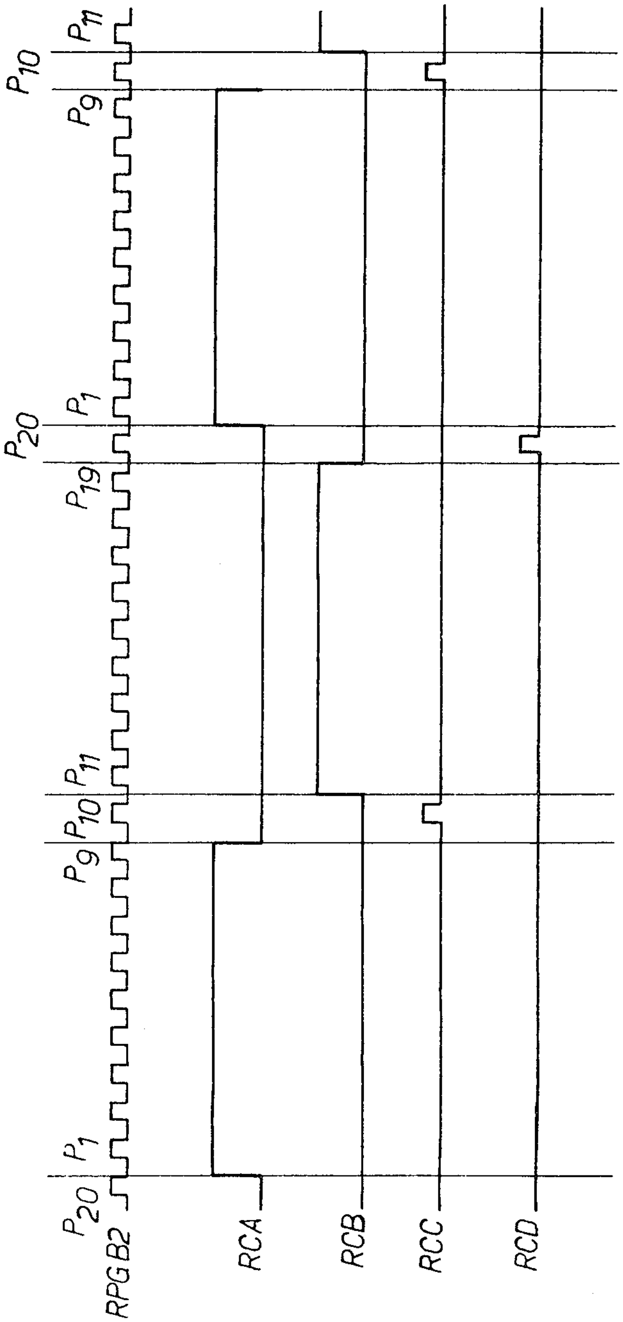
FIG. 4 shows waveforms used in the operation of FIG. 3.

For the generation of the various control pulse trains provided for the operation of the receive terminal equipment and shown in FIG. 4 of the drawings, arrangements similar to those described above with reference to FIG. 1 are provided. Thus a pulse detector and oscillator synch element RPD serves to synchronize a master oscillator OSC for the receive terminal. In this case, the master oscillator OSC drives a pulse generator RPG1 which produces at an output terminal RPGB2 a continuous stream of digit marking pulses at the pulse recurrence rate B2; in FIG. 4 these pulses are labelled RPGB2. The pulse generator RPG1 also drives a clock counter RC1 which counts the digit marking pulses in groups of 20 like polarity pulses, repeatedly, and is adapted to provide control pulse trains RCA, RCB, RCC and RCD at its like designated output terminals. As indicated in FIG. 4, the control pulses RCA are pulses which are "ON" during the occurrence of each alternate sub-group of nine digit signal pulses arriving at the receive terminal, (i.e. digits $P_1$ to $P_9$) at the rate B2, and are "OFF" for the duration of the intervening sub-group of digit signal bits plus two included pattern bits (i.e. $P_{10}$ to $P_{20}$ inclusive). The control pulses RCB are the converse of the control pulses SCA, i.e., are "ON" for the intervening groups of 9 digit signal bits (i.e. $P_{11}$ to $P_{19}$ inclusive) and are "OFF" for the duration of the alternate sub-groups of 9 digit signal bits plus the 2 included pattern bits (i.e. $P_{20}$ and $P_1$ to $P_{10}$). The pulses RCC and RCD are digit marking pulses which mark the pattern digit bits in the incoming digit stream. Thus, the control pulses RCC mark alternate pattern pulses occurring at time $P_{10}$, while the control pulses RCD mark the intervening pattern bits occurring at time $P_{20}$. These latter control pulses (RCC and RCD) also drive a second pulse generator RPG2 which is adapted to provide at an output terminal RPGB1 a stream of digit marking pulses at the pulse recurrence rate B1, i.e. as indicated at SPGB1 in FIG. 2. In this case, the pulse generator RPG2 also drives a second clock counter RC2 which operates in the manner described above for the clock counter SC (FIG. 1) to provide at its output terminal RCA' and RCB' control pulses of the form depicted at SCA and SCB, FIG. 2.

In the operation of the line equipment shown in FIG. 3, the gate RG1 responds to pulse RCA and RCB and gate RG2 responds to pulses RCC and RCD to separate the pattern digit bits from the incoming signal stream arriving over line ll1. Thus, the output from the gate RG1 comprises successive sub-groups of nine digit signal elements separated from one another by the digit period previously occupied by the inserted pattern bit, while the extracted pattern bits appear from the output of gate RG2.

To effect the change in the digit rate of the received sub-groups of digit signal bits from the rate B2 to the rate B1 and also to eliminate the digit period gap between successive sub-groups, two shift registers RR1 and RR2 each of 9 bit capacity are provided and these are arranged with the gates RG3, RG4, RG5 and RG6 for successive and alternate writing and reading, in a manner similar to that described above for the corresponding shift registers SR1 and SR2 in the send terminal of FIG. 1. The digit signal bits from gate RG1 are written into the registers RR1 and RR2 alternately at the digit rate B2 through gates RG3 and RG4 under control of drive pulses from the pulse generator RPGB1 and are read out at the digit rate B1 through gates RG5 and RG6 under control of drive pulses from the pulse generator RPGB2, the change over of the drive pulse sources to the shift registers RR1 and RR2 being effected by the gates RG8, RG9, RG10 and RG11, under the control of pulses RCA', RCA, RCB' and RCB in a similar manner to that described above for the send terminal of FIG. 1.

The pattern digits appearing from the output of gate RG2 are applied to a pattern error detecting element PED, shown in the present example as comprising a pattern register RPR which operates to register the incoming pattern bits as they arrive from the gate RG2, under the control of pulse RCC and RCD, a pattern generator RPT which is driven from the output of OR gate RG7 in response to pulses RCC and RCD to reproduce cyclically the expected pattern to be entered into the pattern register RPR, and a comparator element COMP for detecting the occurrence of errors between the pattern generated by RPT and the pattern registered by RPR at any time. When an error is detected, the comparator COMP passes an error signal to an error counting element EC which also includes logic circuitry for detecting when the number of errors counted in a given time period exceeds a given number or persistently exceeds a given number during each of a number of successive time periods. The logic circuitry thus serves to discriminate between the intermittent error occurrence due to faulty transmission conditions, and a more continuous error occurrence due to loss of alignment between the control pulses RCA, RCB, RCC, RCD, RCA' and RCB' and the structure of the incoming digit stream. In the former case, if the intermittent error rate is high enough to be troublesome but not high enough to be due to loss of alignment the error counting element is adapted to provide a signal on its output lead C/O to operate switching means, not shown, for effecting the transmission channel changeover, or for initiating other action as may be provided for. In the latter case where loss of alignment is thought to have occurred, the signal on the output lead C/O is inhibited and replaced by a second output signal which is passed to a pattern acquisition control element PA which in turn provides signals via its output terminal PAC to delay the counting action of the clock counter RC1 by one digit period at the commencement of each sub-group of 10 digit periods, for example by inhibiting the pulse. The effect of delaying the counting action of counter RC1 is to shift the control pulses generated progressively relative to the incoming digit streams by one digit period for each sub-group of 10 digit periods. The error detector rechecks the new stream of extracted digits after each relative shift. A maximum of nine such shifts may be required before correct alignment is detected by the error detector, but if after ten such shifts a condition corresponding to correct alignment is still not detected, a fault condition is assumed and changeover to a stand-by receive terminal equipment is initiated.

As shown in FIGS. 1 and 3, the check pattern is stored in fixed stores, the pattern having been selected beforehand and been built into the system. Alternatively, the check pattern can be generated by the performing of a simple logical operation on the digits stored in two stages of a shifting register to produce a third digit which is entered into an earlier stage of the register, the pattern appearing in serial form from the last stage of the register; a pattern generated in this way can be detected by entering the pattern serially into a shifting register of a similar arrangement to that used for generating the pattern and comparing the output digit of the logical operation with the digit in the stage of the register corresponding to that into which the output of the logical operation is entered in the pattern generator.

I claim:

1. A system for detecting malfunctioning of a digital transmission channel having a sending terminal and a receiving terminal, the sending terminal including an input circuit for receiving information digits of an original signal at a first pulse repetition frequency to be transmitted through the channel, first storage means connected to the input circuit for storing successive groups of the information digits, means for reading each stored group of information digits from the first storage means at a second pulse repetition frequency higher than the first so as to have gaps between the successive groups of information digits read from the first storage means, and means for inserting the digits of a predetermined multidigit check signal into the gaps so as to produce a digital signal of said second pulse repetition frequency for transmission through the channel, and the receiving terminal including means for separating the digits of the check signal from the information digits in the digital signal after transmission through the channel, second storage means for storing successive groups of the separated information digits, the groups having equal numbers of digits to the groups stored by the first storage means, means for reading the digits from the second storage means at the first pulse, repetition frequency to regenerate the original signal, means for comparing a representation of the predetermined check signal with the digits of the check signal derived from the digital signal by the separating means, and indicating means responsive to errors detected by the comparing means to indicate the occurrence of malfunctioning of the channel.

2. A system according to claim 1, in which the groups of information digits all consist of the same number of digits.

3. A system according to claim 2, in which the means for comparing the check signal derived from the digital signal after transmission through the channel with a representation of the predetermined check signals can produce a first signal if the rate of occurrence of errors detected exceeds a first threshold value and a second signal if the rate of occurrence of errors detected is below the first threshold value and above the second threshold value smaller than the first, the indicating means responding to the second signal, and the separating means responds to the first signal to alter the timing of its operation relative to the digital signal after transmission through the channel so as to tend to bring them into alignment.

4. A system according to claim 3, in which the first storage means includes two shifting registers, each having one more stage that there are digits in a group of information digits, means for entering groups of information digits into the registers alternately at the first pulse repetition frequency, and means for reading the digits from the registers in sequence at the second pulse repetition frequency, the inserting means entering the digits of the check signal in cyclic succession respectively at the ends of successive groups of information digits in the registers.

5. A system according to claim 4, in which the second storage means includes two shifting registers having the same number of stages as there are digits in a group of information digits, means for applying groups of information digits from the separating means for storage in the registers alternatively at the second pulse repetition frequency, and means for reading out the contents of the shifting registers serially at the first pulse repetition frequency, alternately to reproduce the original signal.

* * * * *